(12) United States Patent
Charrat

(10) Patent No.: US 10,185,950 B2
(45) Date of Patent: Jan. 22, 2019

(54) NFC TRANSACTION SERVER

(75) Inventor: Bruno Charrat, Aix-en-Provence (FR)

(73) Assignee: Inside Secure, Aix-en-Provence (FR)

( * ) Notice: Subject to any disclaimer, the term of this patent is extended or adjusted under 35 U.S.C. 154(b) by 0 days.

(21) Appl. No.: 13/297,378

(22) Filed: Nov. 16, 2011

(65) Prior Publication Data

US 2012/0123883 A1    May 17, 2012

(30) Foreign Application Priority Data

Nov. 17, 2010  (FR) .................................. 10 04473
Nov. 17, 2010  (FR) .................................. 10 04475

(51) Int. Cl.
G06Q 20/32     (2012.01)
G06Q 20/20     (2012.01)
G06Q 20/34     (2012.01)
G06Q 30/06     (2012.01)
G07F 7/10      (2006.01)
(Continued)

(52) U.S. Cl.
CPC ......... G06Q 20/325 (2013.01); G06Q 20/204 (2013.01); G06Q 20/32 (2013.01); G06Q 20/322 (2013.01); G06Q 20/3278 (2013.01); G06Q 20/351 (2013.01); G06Q 20/352 (2013.01); G06Q 20/3552 (2013.01); G06Q 20/3574 (2013.01); G06Q 30/0601 (2013.01); G07F 7/1008 (2013.01); H04W 12/02 (2013.01); H04L 63/0272 (2013.01); H04W 4/008 (2013.01); H04W 4/80 (2018.02)

(58) Field of Classification Search
CPC .... G06Q 20/204; G06Q 20/20; G06Q 20/202; G06Q 20/322; G06Q 20/40

USPC ................................................ 705/17; 33/17
See application file for complete search history.

(56) References Cited

U.S. PATENT DOCUMENTS 5,479,654 A   12/1995   Squibb
5,765,173 A   6/1998    Cane et al.
(Continued)

FOREIGN PATENT DOCUMENTS

EP    2009605 A1    12/2008
EP    2160002 A1    3/2010
(Continued)

OTHER PUBLICATIONS

Vigil-Hayes, Morgan Ashlee. Community-based Networks for Challenged Environments. University of California, Santa Barbara, ProQuest Dissertations Publishing, 2017.*
(Continued)

Primary Examiner — Florian M Zeender
Assistant Examiner — Fawaad Haider
(74) Attorney, Agent, or Firm — Brake Hughes Bellermann LLP

(57) ABSTRACT

A near field transaction system includes a first transaction device having near field communication circuitry, and a portable device having near field communication circuitry. The system also includes at least one transaction server having a memory area with at least one application program, and a mechanism for establishing a data link between the server and the near field communication circuitry of the portable device. The application program is configured to perform a transaction with the first transaction device, using the near field communication circuitry of the portable device as a proximity relay to communicate with the first transaction terminal.

17 Claims, 7 Drawing Sheets

(51) Int. Cl.
*H04W 12/02* (2009.01)
*H04W 4/80* (2018.01)
*H04L 29/06* (2006.01)
*H04W 4/00* (2018.01)

(56) References Cited

U.S. PATENT DOCUMENTS

| | | | |
|---|---|---|---|
| 5,794,254 | A | 8/1998 | McClain |
| 5,990,810 | A | 11/1999 | Williams |
| 6,014,676 | A | 1/2000 | McClain |
| 6,038,665 | A | 3/2000 | Bolt et al. |
| 6,049,874 | A | 4/2000 | McClain et al. |
| 6,101,507 | A | 8/2000 | Cane et al. |
| 6,327,578 | B1 | 12/2001 | Linehan |
| 7,469,151 | B2 | 12/2008 | Khan et al. |
| 8,083,140 | B1 | 12/2011 | Katzer et al. |
| 2004/0236803 | A1 | 11/2004 | Spiegeleer |
| 2005/0268068 | A1 | 12/2005 | Ignatius et al. |
| 2006/0118622 | A1* | 6/2006 | Zatloukal et al. ............ 235/382 |
| 2007/0100913 | A1 | 5/2007 | Sumner et al. |
| 2007/0192863 | A1 | 8/2007 | Kapoor et al. |
| 2008/0048022 | A1 | 2/2008 | Vawter |
| 2008/0051059 | A1 | 2/2008 | Fisher |
| 2008/0155257 | A1* | 6/2008 | Werner ................. H04L 9/3226 713/168 |
| 2008/0172340 | A1 | 7/2008 | Karlsson |
| 2008/0238610 | A1* | 10/2008 | Rosenberg .................... 340/5.7 |
| 2009/0094125 | A1* | 4/2009 | Killian et al. .................. 705/17 |
| 2009/0144161 | A1 | 6/2009 | Fisher |
| 2009/0292619 | A1 | 11/2009 | Kagan et al. |
| 2010/0044444 | A1 | 2/2010 | Jain et al. |
| 2010/0058463 | A1 | 3/2010 | Bertin |
| 2010/0082444 | A1* | 4/2010 | Lin et al. ......................... 705/17 |
| 2011/0246904 | A1 | 10/2011 | Pinto et al. |

FOREIGN PATENT DOCUMENTS

| | | |
|---|---|---|
| GB | 2457221 A | 8/2009 |
| WO | 2009091117 A2 | 7/2009 |

OTHER PUBLICATIONS

Venkataramani et al., "Mobile phone based RFID architecture for secure electronic Payments using RFID credit cards," The Second International Conference on Availability, Reliability and Security, pp. 610-620 (2007).
Lu, "Network smart card review and analysis," Computer Networks, vol. 51, No. 9, pp. 2234-2248 (2007).
Madlmayr et al, "Managing an NFC Ecosystem," 7th International Conference on Mobile Business, pp. 95-101 (2008).
Nordlund, "Secure Over-The-Air Services in NFC Ecosystems," retrieved from http://www.nfc-research.at/fileadmin/congress/pdf/05_Venyon_Sirpa_Nordlund.pdf on Feb. 25, 2008.
Search Report and Written Opinion dated Jun. 14, 2011 in FR Application No. 1004473.
Madlmayr, "A mobile trusted computing architecture for a near field communication ecosystem," Proceedings of the 10th International Conference on Information Integration and Web-based Applications & Services, pp. 563-566 (2008).
Search Report and Written Opinion dated Jun. 21, 2011 in FR Application No. 1004475.
Int'l Search Report and Written Opinion dated Mar. 2, 2012 in Int'l Application No. PCT/FR2011/052686.
Int'l Preliminary Report on Patentability dated May 21, 2013 in Int'l Application No. PCT/FR2011/052686.
Office Action dated Aug. 21, 2013 in U.S. Appl. No. 13/297,323.
Office Action dated Jan. 17, 2014 in U.S. Appl. No. 13/297,323.
Non Final Office Action for U.S. Appl. No. 13/297,323, dated Jun. 16, 2016, 41 pages.
Non Final Office Action for U.S. Appl. No. 13/297,323, dated Mar. 29, 2017, 30 pages.

* cited by examiner

NFC TRANSACTION SERVER

BACKGROUND OF THE INVENTION

Embodiments of the present invention relate to a near field transaction method and a near field transaction system.

The last few years, the apparition of inductive coupling contactless communication techniques, also called NFC (Near Field Communication) techniques, changed the field of chip cards, making it possible first to make contactless payment cards, and then, to integrate a secure processor and a NFC controller into electronic portable objects such as mobile phones, to perform near field transactions using them.

FIG. 1 schematically shows a conventional transaction system including a contactless chip card CC1 and a transaction terminal TT. The terminal TT is, for example, a cash point, a sales outlet (e.g., ticket machine, food and drink dispenser, or the like) an automatic paying access control terminal (e.g., metro access terminal, bus payment terminal, or the like).

The contactless card CC1 includes a Contactless Integrated Circuit CIC provided with a secure processor and an antenna coil AC1 connected to the integrated circuit. The terminal TT includes an antenna coil AC2 and is configured to perform a near field transaction with the card CC1 by emitting a magnetic field FLD. The transaction includes exchanging Application Protocol Data Units APDU which will be hereinafter referred to as "application data" for the sake of simplicity. The application data APDU include commands CAPDU sent by the terminal and answers RAPDU sent by the card. The terminal TT may be linked in real time or delay time to a transaction server SV0, to validate a payment and/or debit an account of the user.

FIG. 2 schematically shows a transaction system including a mobile phone HD1 and the transaction terminal TT. The phone HD1 includes a main processor PROC1, a radiocommunication circuit RCCT, a secure processor PROC2 of SIM card (Subscriber Identity Module), a NFC controller referenced "NFCC," an antenna coil AC3 linked to the controller NFCC and a secure processor PROC3 configured to perform NFC transactions.

The processor PROC3 includes a central processing unit CPU, an operating system OS, a Card Application Program CAP and/or a Reader Application Program RAP. The processor PROC3 is linked to the controller NFCC through a bus BS1, for example a Single Wire Protocol bus SWP. In practice, the processor PROC3 may be a Universal Integrated Circuit Card UICC, for example of the mini-SIM or micro-SIM type.

An example of functional architecture of the controller NFCC and the processor PROC3 is shown in FIG. 3. The controller NFCC includes a host controller HC and a Contactless Front End Interface CLF which is linked to the antenna coil AC3. In practice, the host controller HC and the interface CLF may be integrated into the same semiconductor chip, such as the MicroRead® chip commercialized by the applicant.

The bus BS1 linking the processor PROC3 and the controller NFCC is used as physical support for a communication interface called Host Controller Interface (HCI) through which the controller NFCC and the processor PROC3 exchange data in accordance with a Host Controller Protocol HCP. The interface HCI and the protocol HCP are described in the specifications ETSI TS 102 622 of the European Telecommunications Standards Institute, called "Smart Cards; Universal Integrated Circuit Card (UICC); Contactless Front-end (CLF) interface; Host Controller Interface (HCI)." The protocol HCP provides the routing of data according to routing channels called "pipes," through which application data APDU are exchanged during a transaction between the processor PROC3 and the transaction terminal TT.

The interface CLF may generally operate according to several RF technologies referred to as "RFTi" in FIG. 3, for example "Type A" or "Type B," such as defined by ISO/IEC 14443 parts 2, 3 and 4, "Type B'" such as defined by ISO/IEC 14443-2, with a standard framing such as defined by ISO/IEC 14443-3, and "Type F" such as defined by ISO 18092 (as passive mode at 212 and 424 kilobytes per second) or by the Japanese industrial standard JIS X 6319-4.

During the execution of the card application CAP, the processor PROC3 emulates a contactless card and uses the controller NFCC in passive mode to perform a transaction with a transaction terminal TT which emits the magnetic field FLD. A pipe P1 is first opened between the card application CAP and the interface CLF of the controller NFCC, which is configured for the occasion in an RFTi technology. The terminal TT sends to the controller NFCC commands CAPDU that the controller transmits to the processor PROC3 through the pipe P1. The processor PROC3 emits answers RAPDU which are transmitted to the controller NFCC through the pipe P1, and then transmitted to the terminal TT by the controller NFCC, through a pipe RF.

During the execution of the reader application RAP, the processor PROC3 performs a transaction with a contactless integrated circuit CIC arranged in a contactless card CC1 or another support. The controller NFCC is in an active operating mode where it emits a magnetic field FLD. A pipe P1 is first opened between the reader application RAP and the interface CLF of the controller NFCC, which is configured for the occasion in an RFTi technology. The reader application RAP then emits commands CAPDU which are transmitted to the controller NFCC through the pipe P2, and then transmitted to the integrated circuit CIC through a pipe RF. The contactless integrated circuit CIC sends to the controller NFCC answers RAPDU that the controller transmits to the processor PROC3 through the pipe P2.

It is known that the development of the NFC technology is closely related to the development of card applications in portable devices such as mobile phones, so as to use such portable devices as contactless chip cards. Although infrastructures provided with NFC transaction terminals already exist, in particular in the field of payment, the integration of secure processors into mobile phones to execute such applications is not carried out at a sufficient rate to allow the NFC technology to be developed as expected.

A constraint which slows down the development is the complexity and cost of a secure processor such as the processor PROC3 shown in FIGS. 2 and 3. It must preferably be able to execute various card applications and must therefore contain as many bank keys (encryption keys) as card applications supplied by different banks. It must in addition have a sufficient computing power to carry out complex encryption calculations during the authentication phase of a transaction. In addition, the personalization of the processor, i.e., loading a card application CAP into the memory thereof, is a complex operation which must be highly secured and requires external managers such as a Trusted Service Manager TSM. Finally, in the event of phone theft or during a maintenance operation of the phone, the processor PROC3 is susceptible of being attacked by a fraud so as to discover the bank keys it includes.

It may therefore be wished to provide a method allowing a NFC transaction to be performed via a portable device of the mobile phone type having an architecture which is simpler and less expensive to implement than known architectures.

BRIEF SUMMARY OF THE INVENTION

Embodiments of the invention relate to a near field transaction method, including providing a first transaction device including near field communication circuitry, providing a portable device including near field communication circuitry, wherein the method further includes providing at least one transaction server, installing in a memory area of the server at least one application program configured to emulate a second transaction device able to perform a transaction with the first transaction device, establishing a data link between the transaction server and the near field communication circuitry of the portable device, establishing a near field communication channel between the portable device and the first transaction device, and performing a transaction with the first transaction device via the application program, using the near field communication circuitry of the portable device as a proximity relay allowing the application program to communicate with the first transaction device.

According to one embodiment, the method includes configuring the application program so that it emulates a chip card and performs a transaction with a payment point.

According to one embodiment, the method includes configuring the application program so that it emulates a payment point so as to perform a transaction with a chip card or with a second portable device emulating a chip card.

According to one embodiment, the method includes providing in the server a memory area allocated to a user, installing in the allocated memory area several application programs each configured to emulate a second transaction device, selecting an application program in the memory area and using the application program to perform the transaction with the first transaction device.

According to one embodiment, the method includes configuring the server so that it automatically selects the application program in the memory allocated to the user, as a function of information supplied by the first transaction device.

According to one embodiment, installing an application program in the memory area allocated includes a step of requesting an authorization from a certification server.

According to one embodiment, installing an application program in the memory area allocated to the user includes receiving from a certification server an encryption key allocated to the application program, and installing the key.

According to one embodiment, the first transaction device is a second portable device linked to the transaction server, and the transaction is performed between a first application program executed by the server and a second application program executed by the server.

Embodiments of the invention also relate to a near field transaction system, including a first transaction device having near field communication circuitry, a portable device including near field communication circuitry, at least one transaction server including a memory area having at least one application program, and a mechanism for establishing a data link between the transaction server and the near field communication circuitry of the portable device, and the application program is configured to emulate a second transaction device and to perform a transaction with the first transaction device, using the near field communication circuitry of the portable device as a proximity relay to communicate with the first transaction device.

According to one embodiment, the application program is configured to emulate a chip card and perform a transaction with a payment point.

According to one embodiment, the application program is configured to emulate a payment point so as to perform a transaction with a chip card or a second portable device emulating a chip card.

According to one embodiment, the server includes a memory area allocated to a user and including several application programs each configured to emulate a second transaction device.

According to one embodiment, the server is configured to automatically select the application program in the memory allocated to the user, as a function of information supplied by the first transaction device.

According to one embodiment, the portable device is a device exclusively dedicated to perform transactions.

According to one embodiment, the portable device is a mobile phone or a personal assistant.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 4:
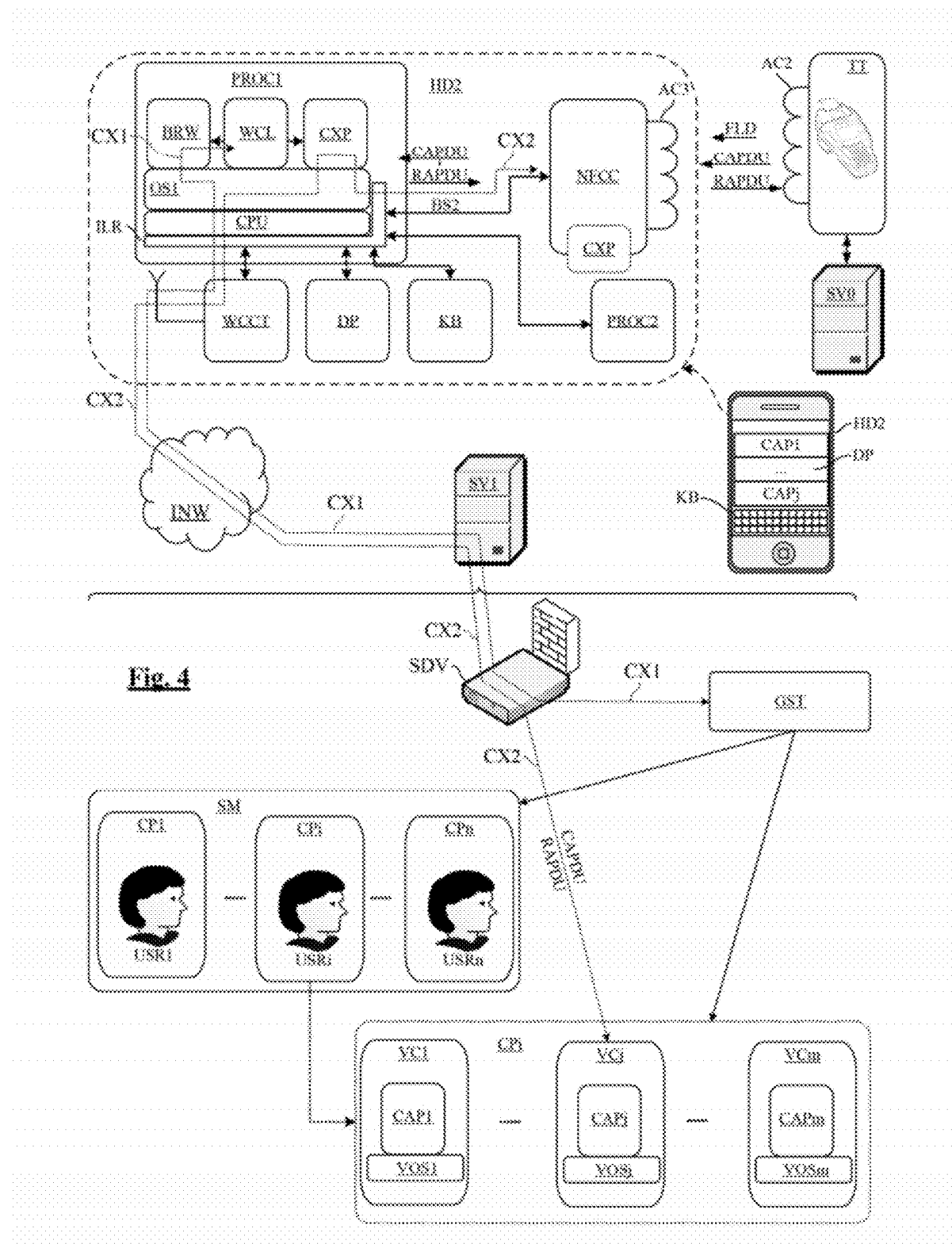
FIG. 4 shows an embodiment of a NFC transaction system according to the invention.

FIG. 4 shows an embodiment of a transaction system according to the invention. The system includes a transaction terminal TT, a portable device HD2 and a transaction server SV1 connected to the Internet.

Figure 1:
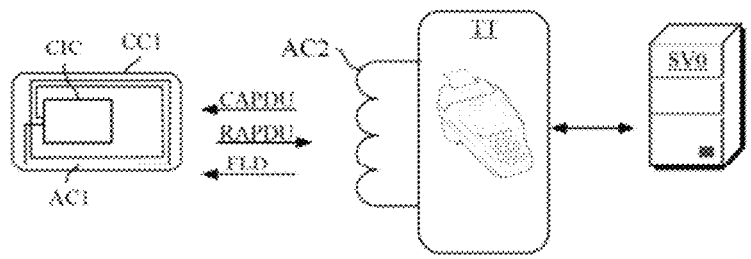
FIG. 1 previously described shows a conventional NFC transaction system including a contactless chip card, FIG. 2 previously described shows a conventional NFC transaction system including a portable device equipped with a secure transaction processor, FIG. 3 previously described is a functional diagram of the transaction system of FIG. 2.
Figure 2:
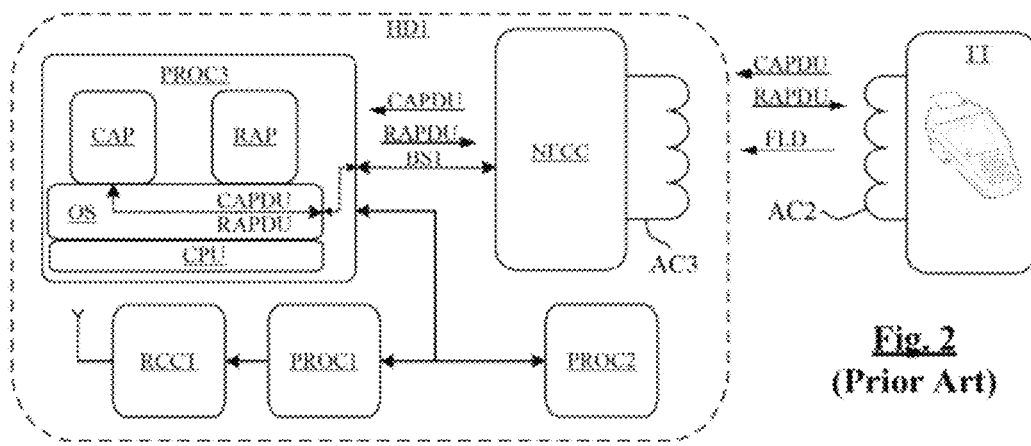
Figure 3:
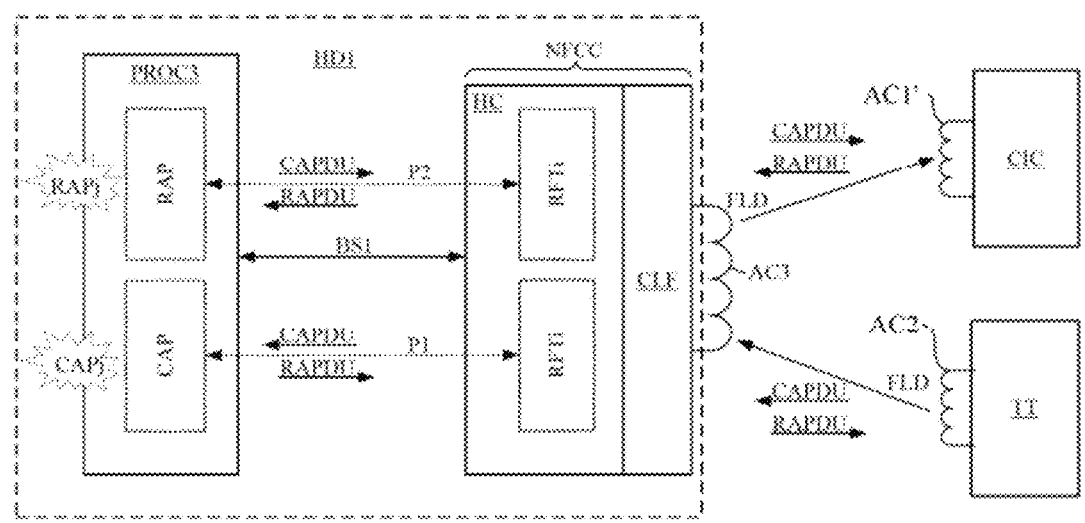

The terminal TT, provided with an antenna coil AC2, is configured to perform a NFC transaction with a contactless NFC card such as that shown in FIG. 1 or a device HD1 such as that shown in FIG. 2.

The device HD2 includes a main processor PROC1, a display DP, a keyboard KB (which may be virtual and shown by the display), a NFC controller "NFCC" provided with an antenna coil AC3 for establishing a near field communication with the terminal TT, and a wireless communication circuit WCCT to allow the device HD2 to connect to the Internet INW.

The device HD2 may be a phone, a PDA (Personal Digital Assistant), an MP3 file reader, or any other portable device provided with circuitry for connecting to the Internet. If it forms a phone, the device HD2 also includes a secure processor PROC2 of SIM card authorizing the subscriber to use the telephone network GSM. The circuit WCCT may be a radiotelephone circuit for connecting to the Internet via the network GSM, for example a Long Term Evolution connection LTE or a GSM 4G connection, a WiFi card, or any other wireless circuitry for connecting to the Internet.

The processor PROC1 may be the main processor of the device HD2, for example a baseband processor if the device HD2 is a mobile phone, or an auxiliary processor. The processor PROC1 includes a central processing unit CPU, a communication interface ILR, and an operating system OS1.

The communication interface circuit ILR, schematically shown in the form of blocs, includes all the connection ports of the processor and software layers for managing the corresponding communication protocols.

The processor PROC1 is linked to the controller NFCC, the processor PROC2, the circuit WCCT, the keyboard KB and the display DP through the interface circuit ILR. More particularly, the processor PROC1 is linked to the controller NFCC through a bus BS2 and a corresponding port of the interface circuit ILR. The bus BS2 is for example a data bus 12C (Inter Integrated Circuit) or SPI (Serial Peripheral Interface).

The server SV1 is configured to offer transaction services to users USRi (USR1, . . . USRn). It includes a security device SDV, a transaction service management program GST, and a memory area SM dedicated to the storage of transaction data and programs. The memory area SM is divided into sectors, each including a portfolio of cards CPi (CP1, . . . CPn). Each sector forming a portfolio of cards CPi is allocated to a user USRi and includes sub-sectors receiving virtual cards VCj (VC1, . . . VCm). Each user USRi subscribing to the transaction services offered by the server SV1 has one or more virtual cards VCj within the portfolio of cards CPi which is allocated to him/her. Each virtual card VCj is configured to perform at least one transaction corresponding to a service, and thus emulate a payment card of a determined type, for example a payment card for the metro, the bus, the supermarket, or more generally a bank card for withdrawing money or paying. A virtual card VCj thus forms the equivalent of a material card, in combination with the portable device HD2. A portfolio of cards CPi thus forms the equivalent of a material portfolio in which the user would place one or more material cards.

Each virtual card VCj (VC1, . . . VCm) includes a virtual operating system VOSj (VOS1, . . . VOSm) and at least one card application CAPj (CAP1, . . . CAPm). From the perspective of the transaction protocol, each virtual card VCj is the functional equivalent of a conventional secure processor PROC3 of the type previously described in relation with FIG. 2, made in prior art in the form of semiconductor chip.

In one embodiment, the virtual operating system VOSj is a program which emulates an operating system OS of conventional secure processor PROC3, while the card application CAPj is a conventional transaction program executable as well as by a conventional secure processor PROC3 as by a virtual operating system VOSj.

In an equivalent embodiment, the virtual operating system VOSj does not emulate an operating system OS of conventional secure processor. The card application CAPj is not executable by a conventional secure processor and is only executable by the virtual operating system VOSj. The virtual operating system VOSj and the card application CAPj are specific programs configured to operate in combination and form, together, the equivalent of a conventional secure processor PROC3 provided with a card application as far as performing a transaction is concerned.

In another equivalent embodiment, the virtual operating system VOSj is included in the card application CAPj, both programs forming a single one.

In one embodiment making a priority of the optimization of the server memory space, the virtual operating systems VOSj and the card applications CAPj of the various virtual cards VCj are emulated by one or more centralized programs executed by the server SV1 in multitask mode. For example, a first central program emulates several operating systems at the same time and a second central program emulates the same card application for several virtual cards at the same time.

In a preferred embodiment making a priority of the security against fraud, the memory area SM contains as many virtual operating systems VOSj and card applications CAPj as virtual cards VCj. In other words, the sectors of the memory area SM containing the portfolios, and also the sub-sectors containing the virtual cards are totally partitioned in relation to one another and include no shared program operating in multitask mode.

In one embodiment, each card application CAPj uses an encryption key Kj(CAPj) which allows it to answer to authentication requests requiring a cryptographic calculation. In the embodiment emphasizing security and the partitioning of the sectors and sub-sectors of the memory area SM, the key Kj is stored in the sub-sector of the memory area SM receiving the memory card VCj which executes this application, i.e. receiving the virtual operating system VOSj and the card application CAPj together forming the virtual card.

The security device SDV protects the server and in particular the access to the memory area SM and the transaction service management program GST. The device SDV may be purely software and executed by the server SV1, or include a hardware part different from the hardware part of the server and a software part executed by the server or the different hardware part. It preferably includes a function of firewall and detection of fraud attempt to access a card application.

The transaction service management program GST, hereinafter referred to as "service manager," performs the creation, activation, update and suppression of virtual cards, with the help of the security device SDV which grants or not the authorizations to that purpose.

The server SV1 uses the device HD2 as a remote NFC interface allowing a virtual card VCi to perform a transaction with the terminal TT. To that end, the processor PROC1 includes, in a program memory, an Internet browser BRW, a program WCL referred to as "web client" and a connection program CXP. The web client WCL is configured to establish a data link CX1 with the server SV1 through the browser BRW, the communication circuit WCCT (connection by telephone LTE for example, or WiFi connection) and the Internet INW. Once connected to the server, the web client WCL dialogs with the security device SDV or with the service manager GST, and shows to the user web pages, information or information requests emitted by them.

The data link CX1 allows the web client WCL to dialog with the security device SDV and the service manager GST, and is shown in dotted line in FIG. 4. The data link CX1 is preferably a secure connection using, for example, the conventional Secure Sockets Layers technology SSL based on a public key encryption method establishing a ciphered communication channel after an authentication step.

The connection program CXP is configured to perform establishing a second data link CX2 between the controller NFCC and a virtual card VCj, through the bus BS2, the communication circuit WCCT and the Internet INW. In one embodiment, the data link CX2 is established after receiving a connection request emitted by the web client WCL or the browser BRW. In another embodiment, the data link CX2 is permanently established between the controller NFCC and the security device SDV. The device SDV renders the data link CX2 accessible to a virtual card VCj at the time when the virtual card must perform a transaction.

Like the data link CX1, the data link CX2 is preferably secure. The data link CX2 is for example formed via http (HyperText Transfer Protocol) communication pipes or via a low level User Datagram Protocol link UDP so as to limit data exchange load. The data link CX2 may also be encrypted with the SSL technology or via a proprietary coding.

In another variation, the controller NFCC is provided with circuitry for connecting to the Internet and a proprietary encryption system is provided in the program memory thereof. This method allows a point-to-point ciphered tunnel to be made between the server SV1 and the controller NFCC and offers a very high security level which cannot be attacked by spy software which would have been inserted into the program memory of the processor PROC1. In such an embodiment, the connection program CXP may be arranged in the program memory of the controller NFCC, like schematically shown by a dotted line in FIG. 4. In that case, the bus BS2 is used to allow the program WCL to send to the controller NFCC a connection request to the server SV1 at the beginning of a transaction step S10 described below. An additional data bus may be provided to directly link the controller NFCC to the wireless communication circuit WCCT, without passing by the processor PROC1.

In another variation, a coprocessor dedicated to the communication establishment and encryption is provided. This coprocessor is linked to the controller NFCC and to the wireless communication circuit WCCT and allows a card application CAPj to take control of the controller NFCC without depending on the software of the processor PROC1 and on a possible spy program that it may include.

In another variation, the portable device HD2 includes a single processor performing both controlling the elements of the device HD2 and controlling NFC transactions in relation with the transaction server SV1.

In brief, according to the embodiment chosen, the connection program CXP may be included into the web client WCL, be included into the operating system OS1 of the processor PROC1, be included into a program memory or into the operating system of the controller NFCC, be executed by a dedicated coprocessor, or be executed by a single processor replacing the processor PROC1 and the controller NFCC.

Figure 5:
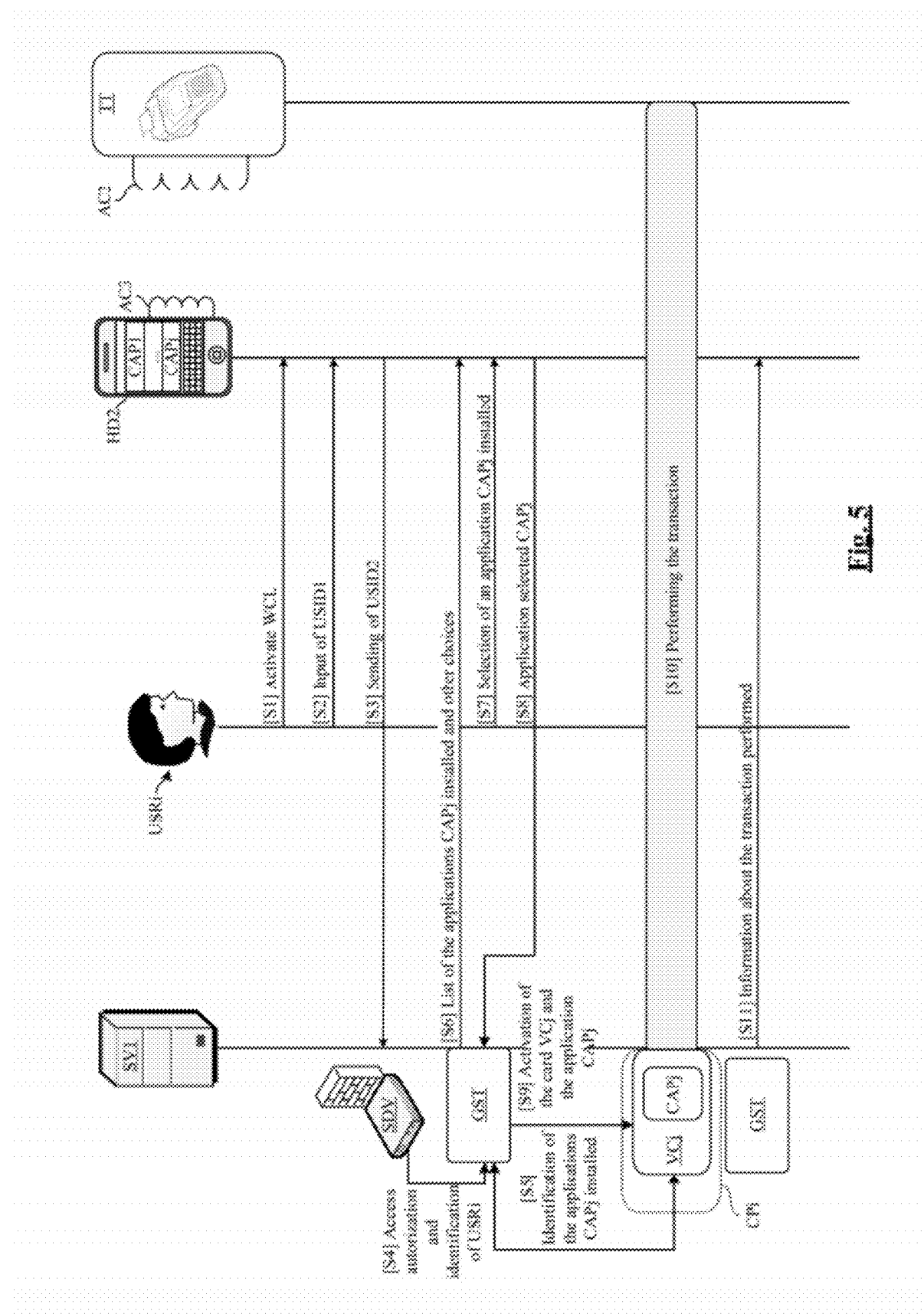
FIG. 5 shows steps of a NFC transaction performed via the system of FIG. 4.

FIG. 5 shows steps of an embodiment of a transaction method according to the invention, implemented via the transaction system of FIG. 4.

It is assumed here that a user USRi is near the terminal TT and wishes to use the portable device HD2 to perform a transaction. The user first activates the web client program WCL (Step S1), for example by pushing a key of the keyboard or selecting a menu shown on the display. The program WCL then asks the user to supply identification data USID1.

After inputting the data USID1 (Step S2), the web client WCL connects to the security device SDV via the data link CX1 and supplies identification data USID2 thereto (Step S3). The data USID2 include all or part of the identification data USID1 and may include additional identification data such as data peculiar to the device HD2 that the web client takes in a memory of the device HD2.

The identification data USID1 may be varied and their aim is to guarantee a high level of security. They may include a login (user name or email) that the user must supply as well as a password. A security code sent by a bank to a user, for example via a message of the SMS type, may also be included in the data USID1. Biometric data (e.g., voice, face, fingerprints, or the like) and/or dynamic data specific to the user, for example user code input data (e.g., input stress on the keyboard, input time, or the like) may also be used as identification data USID1. These biometric or dynamic data makes it possible to check, in addition to checking the user code, that this code has been input by the right person.

The data USID2 may include all or part of the data USID1 and the additional data the user has supplied only once for the creation of his/her portfolio of cards CPi. It may be identity data such as the birth date, the identity card number, the passport number, the user home address, or the like. The data USID2 may also include data peculiar to the device HD2, such as the user phone number, an identification number of the device, for example, if it is a phone, the IMEI (International Mobile Equipment Identity) number and the SIM card number.

The security device SDV then uses the data USID2 to check the legitimacy of the connection request. If the check result is positive, the device SDV gives the service manager GST the user identity USRi and a service access authorization (Step S4). It also opens the data link CX1 to the service manager GST, if it has not been done previously.

Then, the service manager GST accesses the user portfolio CPi and determines if virtual cards VCj and corresponding card applications CAPj have been installed therein (Step S5).

If this is the case, the manager GST presents to the user, via the web client, a list of services corresponding to the card applications CAPj installed (Step S6) and asks him/her to select the service s/he wishes to use to perform a transaction. The services are for example "access to the metro X," "payment checkout at the supermarket Y," "bank card Z," or the like. This home page also offers other choices to the user, in particular the installation of a new virtual card and a corresponding card application, the implementation of this option being described hereinafter.

The user selects the service wanted (Step S7) and his/her choice ("card application CAPj selected") is sent to the manager GST by the web client (Step S8).

In a variation of Steps S7, S8, the user only confirms his/her wish to perform a transaction without specifying the service desired. In this case, the adapted card application CAPj is automatically selected at the time of transaction.

The web client WCL then asks to the connection program CXP to establish the data link CX2 between the server SV1 and the controller NFCC, while the service manager GST selects and activates the virtual card VCj of the user and the card application CAPj that the user has designated (Step S9). The user brings the device HD2 closer to the transaction terminal TT so that inductive coupling establishes between the antenna coils AC2 and AC3. In another variation, the data link CX2 is previously established between the security device SDV and the controller NFCC, and is simply rendered accessible to the card application CAPj by the device SDV after Step S9.

The virtual card VCj is then linked to the controller NFCC. A connection is established with the transaction terminal TT and the card application CAPj of the virtual card VCj executes the transaction requested (Step S10). This transaction may include actions of the user, such as accepting an amount or choosing a product. Although it is not shown in FIG. 5, the transaction terminal TT may also be linked to a bank server SV0 (Cf. FIG. 4) which requires authentication steps and checks that all the answers to authentication requests have really been sent by a card application using an authorized bank key.

When the transaction is over, the data link CX2 is closed, the virtual card VCj is deactivated and the manager GST sends to the web client WCL information about the transaction performed, for example the object and amount of the transaction (Step S11). The web client may memorize and present the information to the user.

Those skilled in the art will note that the transaction method and the transaction system which have just been described are susceptible of other variations. In particular, the web client WCL is a "head-up" program which uses web pages or data supplied by the server SV1 to form a user interface. Such a program may not be necessary. In this case, the user directly dialogs with the security device SDV and the service manager GST through web pages that both elements show him/her via the browser BRW.

Figure 6:
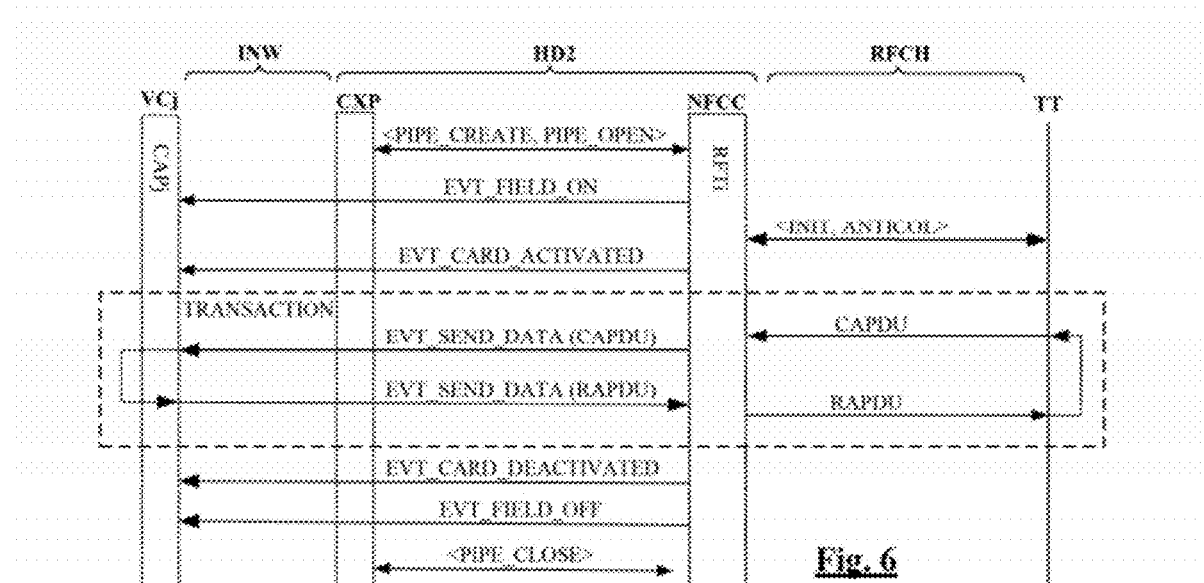
FIG. 6 shows in greater details some steps of the transaction.

FIG. 6 shows an example of transaction performed at Step S10. The transaction includes the following steps:

i) A pipe P1 is created between the virtual card VCj and a technology RFTi executed by the controller NFCC, via commands "PIPE_CREATE," "PIPE_OPEN." This step may be performed by the connection program CXP, as shown. Alternately, this step may be performed by the virtual card VCj itself, if it includes a program for managing the interface HCI, or by the security device SDV. It is to be noted that the pipe P1, here complying with the protocol HCP, is established through the data link CX2 which passes through the Internet and the bus BS2;

ii) The controller NFCC detects the magnetic field emitted by the terminal TT and sends the command EVT_FIELD_ON to the virtual card VCj;

iii) The controller NFCC performs steps for initializing a communication with the terminal TT including creating a NFC communication pipe (referred to as "RFCH" in FIG. 6, or RF pipe) as well as possible steps of anticollision if other NFC devices or contactless cards are located in the interrogation field of the terminal TT (step "INIT, ANTICOL");

iv) When the connection with the terminal TT is established, the controller NFCC sends a command EVT_CARD_ACTIVATED to the virtual card VCj to indicate to it that a transaction can begin.

The actual transaction then includes the following steps:

sending commands CAPDU by the terminal TT to the processor NFCC, via the communication pipe RF;

transmitting these commands to the card application CAPj of the virtual card VCj by the controller NFCC, through the pipe P1, in an encapsulated form into commands EVT_SEND_DATA;

sending to the controller NFCC, by the card application CAPj of the virtual card VCj, answers RAPDU, via the pipe P1, in an encapsulated form into commands EVT_SEND_DATA; and transmitting the answers RAPDU to the terminal TT by the controller NFCC, via the pipe RF.

The commands CAPDU and the answers RAPDU (usually referred to as "C-APDU" and "R-APDU") are defined by the standard ISO 7816-4. In a variation of the transaction, encapsulating the commands CAPDU and the answers RAPDU is performed via the http protocol instead of using encapsulation commands EVT_SEND_DATA.

The first command CAPDU sent by the terminal TT may be a command for selecting the card application CAPj, for example the command "SELECT_AID" such as defined by the standard ISO 7816-4. If the card application has previously been selected by the user at Step S7 and if this application does not correspond to that requested by the transaction terminal TT, the virtual card VCj sends an error message and the transaction is interrupted.

In the variation of Step S7 described above, where the user only confirms his/her wish to perform a transaction without selecting a determined virtual card, the virtual card containing the adapted card application is automatically selected by a card selection program included in the portfolio of cards of the user. At the beginning of Step S10, this high level program performs the initial activation of the card application gate CAG and the creation of the pipe P1 so as to receive the command for selecting the card application. It then activates the card application designated by the command, if it is installed in the portfolio of cards. If not, the transaction is interrupted.

When the transaction is over (or interrupted), the terminal TT stops emitting the magnetic field and the controller NFCC sends to the virtual card VCj a command EVT_CARD_DEACTIVATED for deactivating the card application and a command EVT_FIELD_OFF indicating that the magnetic field is no longer present. The pipe P1 is then closed between the virtual card VCj and the controller NFCC, via a command "PIPE_CLOSE." This step of closing the pipe P1 may be performed by the virtual card VCj itself or the connection program CXP, as shown. Alternately, this step may be performed by the security device SDV. The service manager GST then executes Step S11 described above (FIG. 7).

Those skilled in the art will note that this example of transaction through an interface HCI is not limiting. The connection between the virtual card VCj and the controller NFCC may be established via various other protocols and other commands may be provided.

The example of transaction which has just been described presupposes on the one hand that the user USRi has a portfolio of cards CPi and, on the other hand that the portfolio contains at least the virtual card VCj necessary for this transaction.

Figure 7:
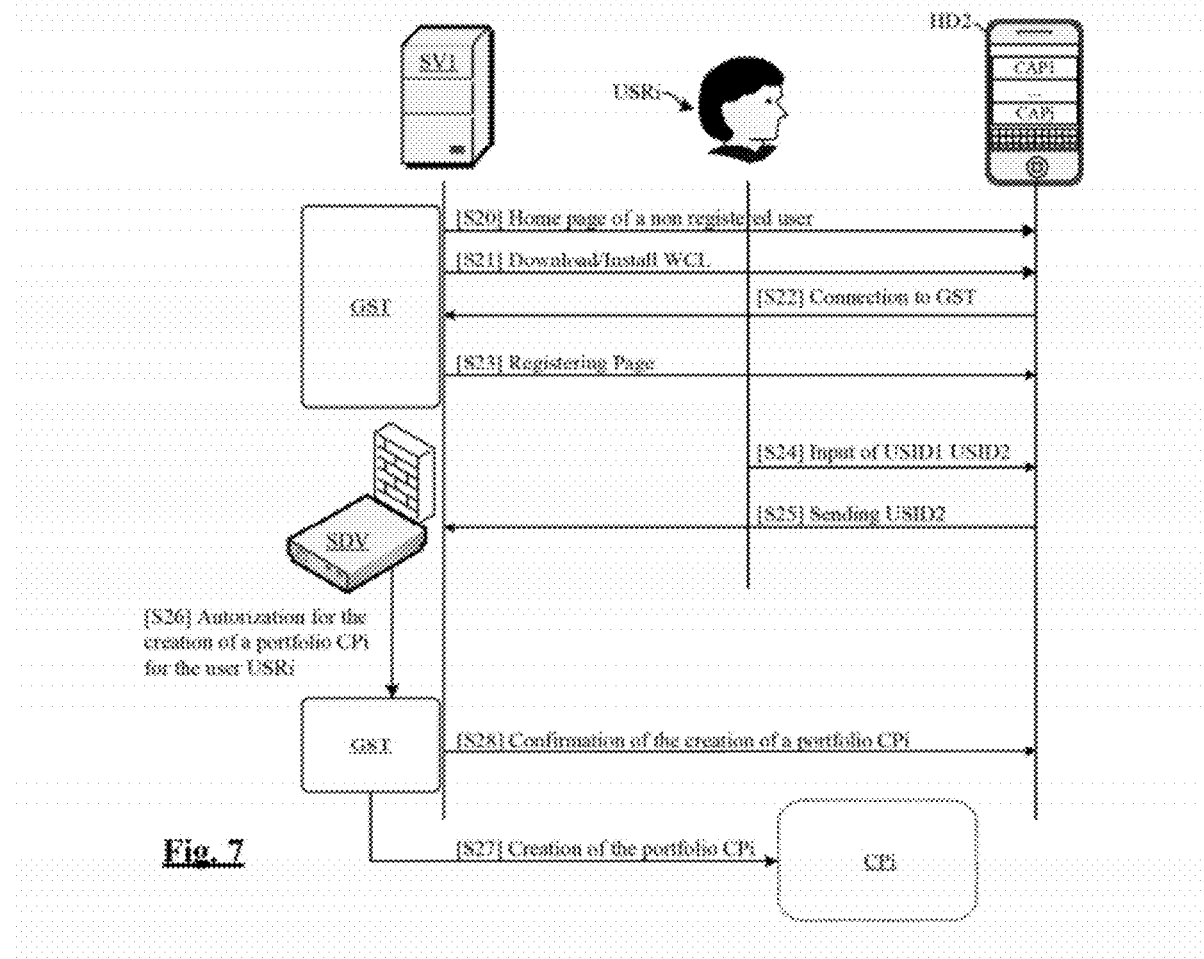
FIG. 7 shows an embodiment of a method for declaring a user to the transaction system of FIG. 4.

FIG. 7 shows an embodiment of a method for creating a portfolio of cards CPi. It is assumed that the user USRi first connects to the service manager GST as a non registered user, via an Internet connection. The manager GST then supplies to the device HD2 a home page for non registered users, in which the user is offered to subscribe to the transaction services (Step S20). The acceptance by the user of the offer here triggers the download and installation of the web client WCL in the device HD2 (Step S21). The web client WCL connects to the manager GST (Step S22) via the data link CX1 and the manager GST sends to the user a registering page (Step S23) in which information is requested, to form the identification data USID1. In addition to these data, the user may be invited to communicate his/her bank details and any additional data allowing the data USID2 to be defined. The web client may also take in the device HD2 data specific to it, intended to form data USID2.

When the web client WCL has all the data USID1 and USID2 (Step S24) and possible other information necessary for the user to subscribe, it supplies the data USID2 to the security device SDV (Step S25). The security device SDV then checks the identification data USID2, determines if the user USRi can be authorized to have a portfolio of cards, and sends an authorization for creating the portfolio to the service manager GST (Step S26).

The manager GST then creates the portfolio CPi (Step S27). In practice, this creation may simply consist in registering the user in a database containing the identification data USID2 and a look-up table indicating the sector of the memory area SM allocated to the user.

The manager GST then sends to the device HD2 a confirmation of creation of the portfolio CPi (Step S30).

Figure 8:
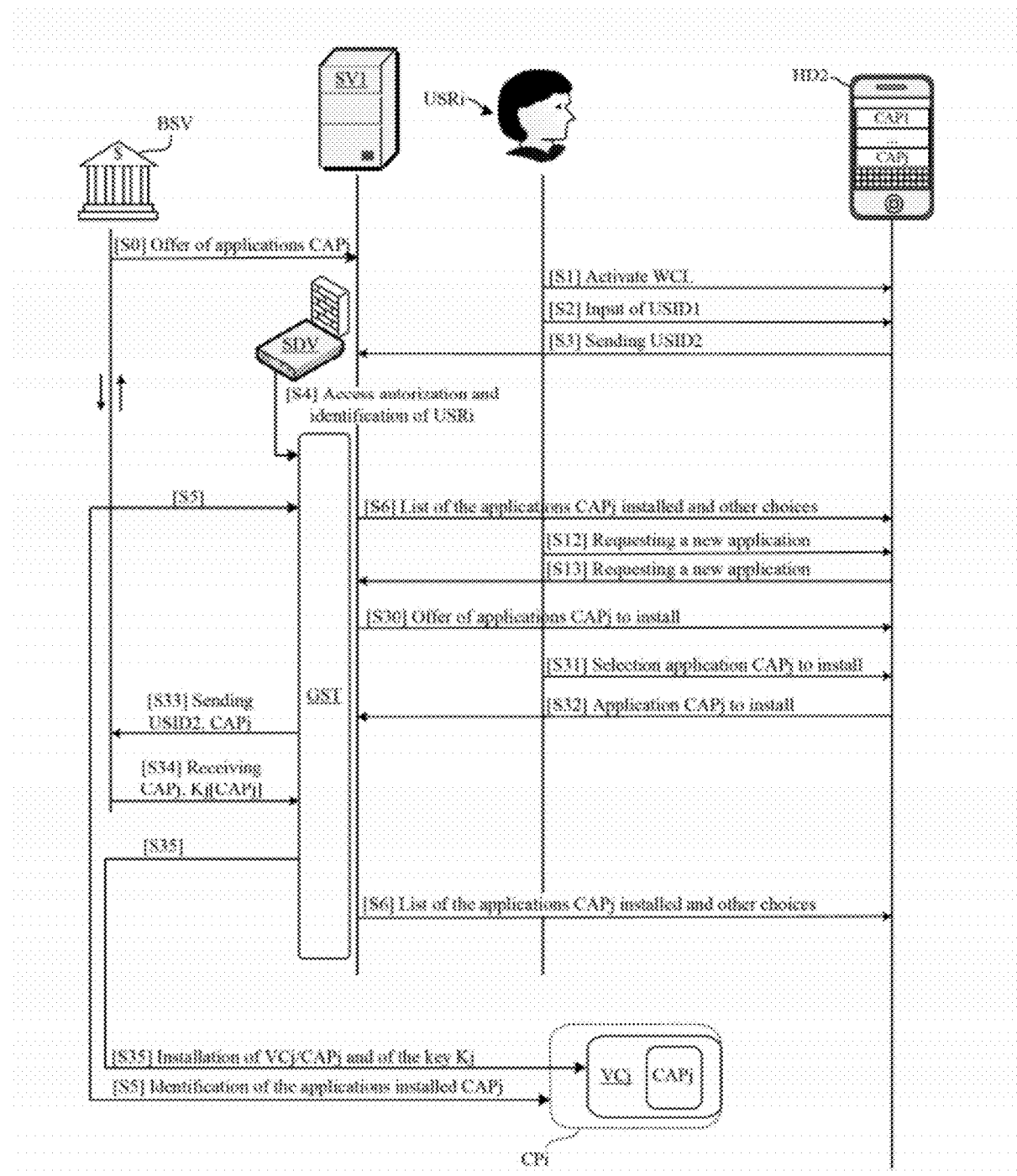
FIG. 8 shows an embodiment of a method for activating an application before the implementation thereof in the transaction system shown in FIG. 4.

FIG. 8 shows an embodiment of a method for acquiring a virtual card VCj. This method can be initiated after Step S28 previously described or, as shown in the figure, after a new connection to the server SV1. This new connection includes the steps previously described i.e., activating the web client (Step S1), inputting the data USID1 (Step S2), sending the data USID2 to the security device SDV by the web client (Step S3), to check the legitimacy of the connection request, checking the legitimacy of the connection request by the security device and communicating to the manager GST an access authorization (Step S4), accessing the portfolio CPi by the manager GST and determining the card applications CAPj which have been installed therein (Step S5), sending the user a list of the card applications CAPj installed, as well as a suggestion of installation of a new card application (Step S6).

It is assumed here that the user selects the option "installation of a new application" (Step S12) instead of selecting an application (Step S7, FIG. 5), because s/he does not have any application installed or because s/he wishes to install a new one.

The web client sends the new application request to the service manager GST (Step S13). The following steps imply one or more bank servers, or certification servers, or preferably a single certification server BSV gathering the services of one or more banks. Before processing the request of installation of a new application, the service manager GST may have previously received from the certification server BSV an offer of applications CAPj (Step S0).

The service manager GST thus sends to the device HD2 a page of offer of card applications CAPj presented in the form of an offer of transaction services (Step S30).

The user then selects a transaction service, which corresponds to the selection of a card application CAPj (Step S31). His/her choice is sent to the manager GST by the web client (Step S32).

The manager GST then provides the server BSV with the user identification data USID2 as well as an identifier of the card application CAPj requested (Step S33), and requires an authorization for creating the corresponding virtual card. This step may include multiple accesses to the bank server. It may possibly be delayed if the certification server indicates that the user must previously be contacted by commercial attaches to perform some procedures. Conversely, the user may have already performed the procedures and supplied in the data USID1 a code received from the bank, which authorizes him/her to obtain the card.

After checking, the server BSV sends to the manager GST the program of the card application and an activation bank key Kj(CAPj) allowing the card application to be used (Step S34). This key forms an encryption key allowing the application to authenticate to a transaction terminal, when it is requested thereto. The manager GST then creates the virtual card VCj in the portfolio CPi, and installs if need be the virtual operating system VOSj of the card, and then installs the application CAPj in the virtual card VCj, and installs the key Kj (Step S35).

In a variation, various card applications CAPj are memorized in a space for storing applications of the manager GST and the certification server supplies only the activation key Kj.

The manager GST then returns to Step S6 to present to the user a list of the card applications CAPj installed, as well as a suggestion of installation of a new card application. The user may decide to install a new application again, to use the one which has just been installed or an application previously installed, or to disconnect from the server SV1.

In a variation, the manager GST does not have any right to modify virtual cards VCj and steps S33, S34 and S35 are left to the security device SDV.

The example of transaction system which has just been described is susceptible of various other embodiments. In particular, embodiments of the transaction system may relate to the virtualization of a payment point implementing a payment point application instead of a card application. A payment point application PAPj differs from a card application CAPj in that the aim thereof is to collect an amount of money through a transaction with a chip card allowing the payer to be identified.

Figure 9:
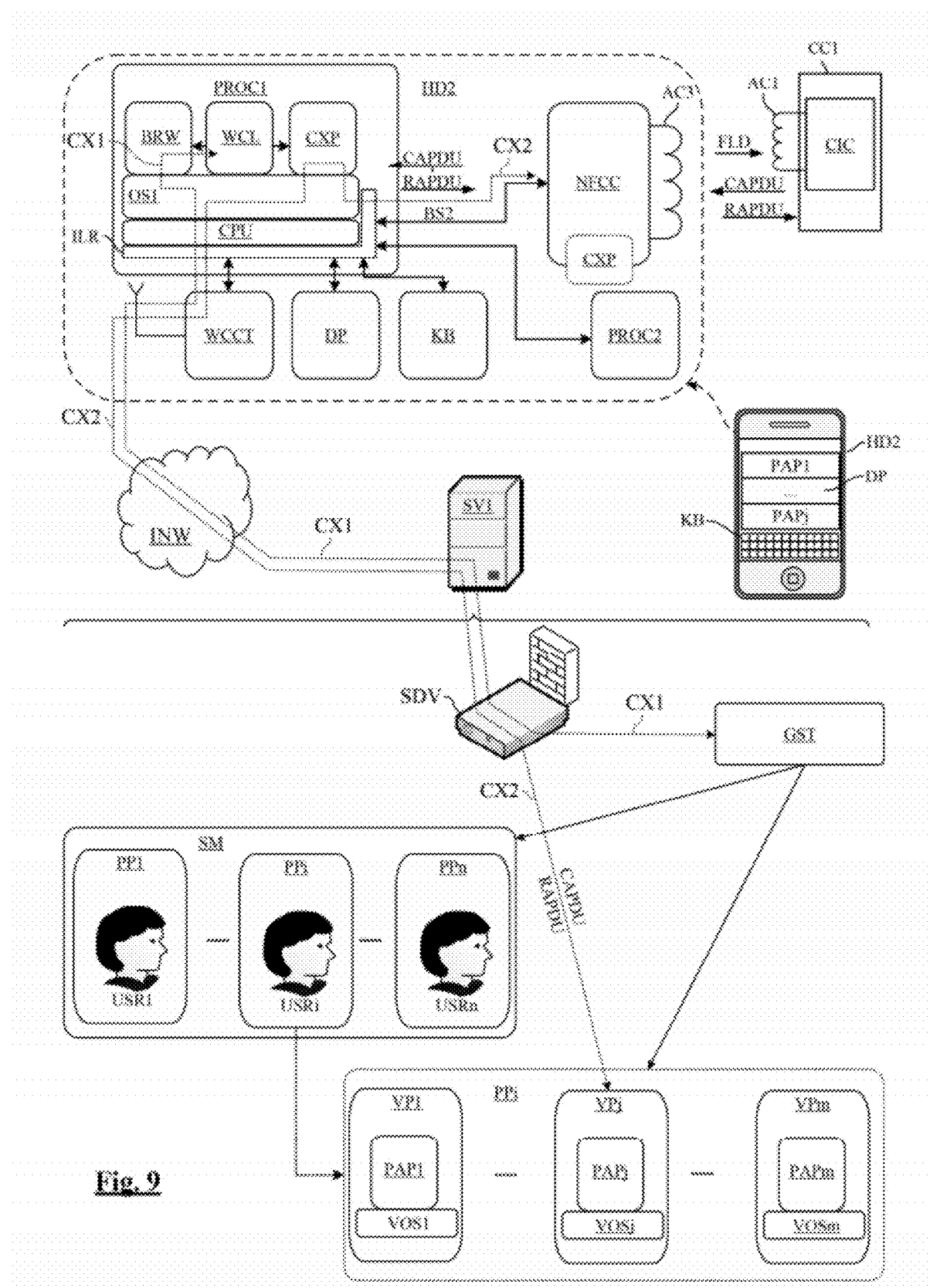
FIG. 9 shows another embodiment of a NFC transaction system according to the invention.

FIG. 9 shows a transaction system which has, in relation to that of FIG. 4, the following differences:

the device HD2, instead of being arranged facing a transaction terminal TT, is arranged facing a contactless card CC1 including an antenna coil AC1 and a contactless integrated circuit CIC, and performs a transaction with it;

the server SV1, instead of managing card applications CAPj arranged in virtual cards VCj, which are arranged in portfolios of cards CPi, manages payment point applications PAPj (PAP1, . . . PAPm) arranged in virtual payment points VPj (VP1, . . . VPm), which are arranged in portfolios of payment points PPi (PP1, . . . PPn) allocated to users USRi. Each virtual payment point may include, in addition to a payment point application PAPj, a program VOSj (VOS1, . . . VOSm) for emulating an operating system of a payment terminal, which may also be included into the payment point application PAPj.

By analogy with the conventional transaction system shown in FIG. 1, the device HD2 acts here as transaction terminal TT. The controller NFCC emits the magnetic field FLD required to establish a contactless communication pipe with the card CC1. The payment point application program PAPj takes the control of the controller NFCC to perform the transaction. It emits commands CAPDU and receives answers RAPDU. The payment point application program PAPj may be configured to connect, during or after the transaction, to a bank authorization server such as the server SV0 shown in FIG. 1.

The method shown in FIG. 5 may be adapted for performing a transaction in payment point mode, by activating at Step S10 a payment point application PAPj instead of a card application CAPj, and by searching at Step S5 for the virtual payment points VPj installed in the portfolio PPi of a user USRi. At Step S6, the method may include the presentation of a list of available payment point applications PAPj instead of the presentation of a list of card applications CAPj, or a presentation of both types of transaction services. Eventually, the method shown in FIG. 7 may be adapted to the creation of a portfolio of payment points PPi instead of a portfolio of cards CPi. Likewise, the method shown in FIG. 8 may be modified so that Steps S31 to S35 relate to the installation of a payment point application and a virtual payment point.

Figure 10:
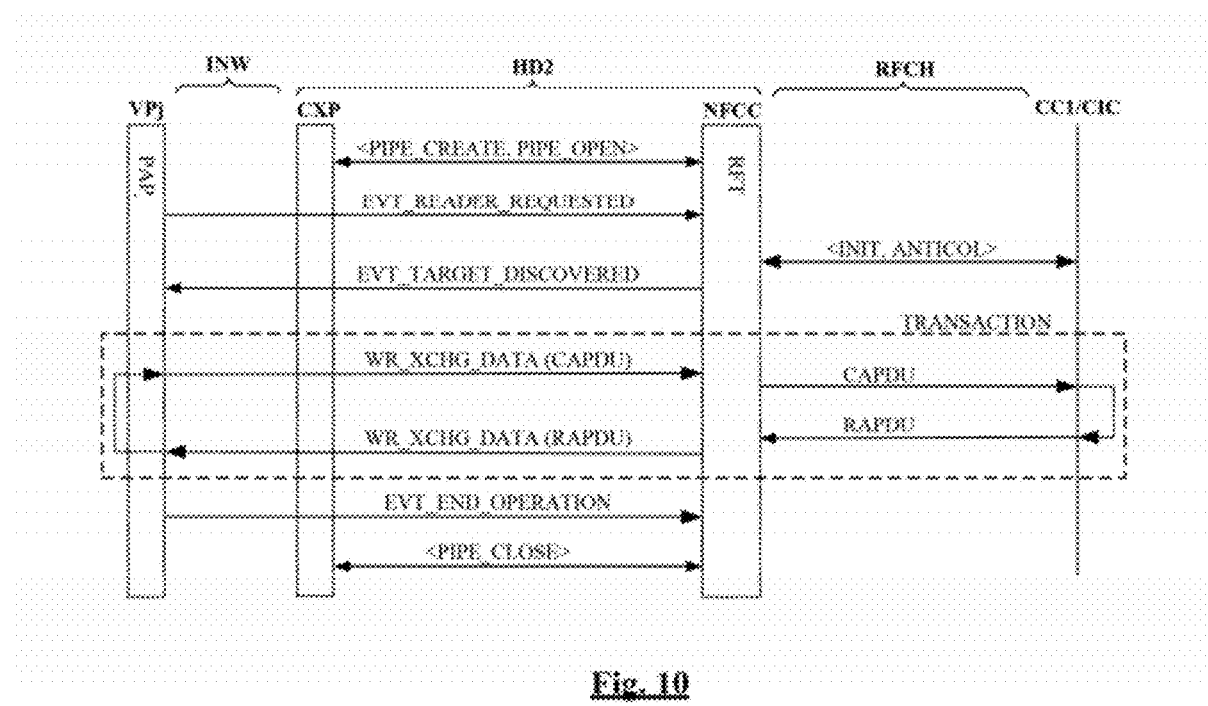
FIG. 10 shows steps of a NFC transaction performed via the system of FIG. 9.

FIG. 10 shows an example of transaction performed between a virtual payment point VPj and the contactless card CC1, which is implied for example at Step S10 of the method of FIG. 5 adapted for performing a transaction in payment point mode. The transaction includes the following steps:

i) A pipe P2 is created between the virtual payment point VPj and a technology RFTi executed by the controller NFCC, via commands "PIPE_CREATE," "PIPE_OPEN." This step may be performed by the connection program CXP, as shown. Alternately, this step may be performed by the virtual payment point VPj itself, if it includes a program for managing the interface HCI, or by the security device SDV, before it renders the data link CX2 accessible to the virtual payment point VPj;

ii) Sending to the controller NFCC interrogation commands EVT_READER_REQUESTED, which detect the presence of the contactless integrated circuit CIC (interrogation method called "polling"). This step may be performed by the virtual payment point VPj, as shown. Alternately, this step may be performed by the connection program CXP, or by the security device SDV, before it renders the data link CX2 accessible to the virtual payment point VPj;

iii) When the contactless integrated circuit CIC of the card CC1 is detected, the controller NFCC performs the steps "INIT, ANTICOL" for initializing a communication with the contactless integrated circuit CIC including the creation of a communication pipe RF (referred to as RFCH in FIG. 10), and optionally anticollision steps (if other contactless integrated circuits are present in the field), The controller NFCC sends the command EVT TARGET DISCOVERED to the virtual payment point VPj to indicate thereto that a transaction can begin.

The actual transaction then includes the following steps:

Sending to the controller NFCC, by the virtual payment point application PAPj, commands CAPDU, via the pipe P2, the commands CAPDU being encapsulated into commands WR_XCHG_DATA, Transmitting by the controller NFCC commands CAPDU to the contactless integrated circuit CIC, through the pipe RF, Sending to the controller NFCC, by the contactless integrated circuit CIC, answers RAPDU, Transmitting the answers RAPDU to the virtual payment point application PAPj, by the controller NFCC, via the pipe P2, the answers RAPDU being encapsulated into commands WR_XCHG_DATA.

The transaction is closed when the command EVT_END_OPERATION is sent to the controller NFCC. This step may be performed by the virtual payment point VPj, as shown. Alternately, this step may be performed by the connection program CXP, or by the security device SDV, before it renders the data link CX2 accessible to the virtual payment point VPj;

The pipe P2 is then closed via a command "PIPE_CLOSE." This step may be performed by the connection program CXP, as shown. Alternately, this step may be performed by the virtual payment point VPj itself, if it includes a program for managing the interface HCI, or by the security device SDV.

The transaction system shown in FIG. 9 is susceptible of different variations. For example, the contactless card CC1 may be replaced by another portable device HD2' which operates in the card emulation mode, such as previously described with reference to FIGS. 5 and 6. If the same server SV1 manages both card applications and payment point applications, both portable devices HD2, HD2' facing each other may execute a transaction, one as card, or payer, and the other as payment point, or receiver, while being simultaneously connected to the same server SV1. A transaction system according to the invention may therefore allow private transactions to be performed, for example a transfer of an amount of money from a person to another via their mobile phones.

Eventually, it is to be noted that the device HD2 used before to perform a transaction with a transaction device such as the terminal TT (FIG. 4) or the contactless card CC1 (FIG. 9), may be different from a mobile phone, a PDA or any other portable object generally used for other purposes than near field transactions. Thus, in some embodiments, the device HD2 may be entirely dedicated to perform near field transactions and include a low cost simplified controller provided with near field communication circuitry and a mechanism for connecting to the server and mainly configured to act as proximity relay between the server and the transaction device. To allow the user to choose between the transaction services offered by the server, such a low cost device may be provided with simplified keyboard and screen including minimum functionalities allowing the user to make his/her choices. In some embodiments, this low cost "relay device" may include no mechanism to interface with the user, the choice of the adapted virtual card being automatically made by the server at the time of the transaction. In this case, it may be offered to the user to connect to the server via another device, for example a personal computer, to configure the portfolio of virtual cards or virtual payment points it has, by adding thereto or deleting cards or payment points.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for performing a transaction with a transaction device using a portable device and a transaction server located externally and remotely from the portable device and the transaction device, the method comprising:

installing, in a memory area of the transaction server, a processor emulation program, the processor emulation program being configured, when executed by the transaction server, to:
process transaction device Application Protocol Data Units (APDUs) sent by the transaction device; and
send transaction server APDUs to the transaction device;

establishing, via the Internet network using wireless communication circuitry of the portable device, a data link between the transaction server and near field communication circuitry of the portable device;

based on information provided by the portable device or information provided by the transaction device, activating, by the transaction server, the processor emulation program, and operatively coupling the processor emulation program to the near field communication circuitry of the portable device through the data link;

establishing a contactless near field communication channel between the portable device and the transaction device;

receiving, by the portable device via the contactless near field communication channel and the near field communication circuitry of the portable device, the transaction device APDUs;

transferring, by the portable device to the transaction server via the data link, the transaction device APDUs;

receiving, by the portable device via the data link, the transaction server APDUs;

transferring, by the portable device to the transaction device via the near field communication circuitry and the contactless near field communication channel, the transaction device APDUs; and as a result of the transaction server executing the processor emulation program, the transaction server:
　receiving, using the portable device acting as an intermediary, the transaction device APDUs;
　processing the transaction device APDUs; and
　sending, to the transaction device using the portable device as the intermediary, the transaction server APDUs; and processing, by the transaction device, the transaction server APDUs, the transaction device APDUs including responses to commands sent to the transaction device by the transaction server, or commands sent by the transaction device to the transaction server, and the transaction server APDUs including commands sent by the transaction server to the transaction device, or responses to commands sent to the transaction server by the transaction device, wherein the near field communication circuitry of the portable device, during performance of the transaction, acts as the intermediary between the transaction server and the transaction device.

2. The method according to claim 1, comprising configuring the processor emulation program to emulate a chip card and perform a transaction with a payment point.

3. The method according to claim 1, further comprising configuring the processor emulation program to emulate a payment point so as to perform a transaction with a chip card or with a second portable device emulating a chip card.

4. The method according to claim 1, further comprising:
　providing in the transaction server a memory area allocated to a user,
　installing, in the memory area of the transaction server, a plurality of processor emulation programs, each processor emulation program of the plurality of processor emulation programs being configured to operate as a respective of the plurality of processor emulation programs being configured to operate as a respective functional equivalent of a secure processor located within the portable device, and
　selecting, by a service management program, a processor emulation program from the plurality of processor emulation programs in the memory area of the transaction server and using the selected processor emulation program to perform the transaction with the transaction device.

5. The method according to claim 4, further comprising configuring the service management program in the transaction server to automatically select the selected processor emulation program in the memory allocated to the user, as a function of the information provided by the transaction device.

6. The method according to claim 4, wherein installing the processor emulation program in the memory area of the transaction server includes requesting an authorization from a certification server.

7. The method according to claim 4, wherein installing the processor emulation program in the memory area allocated to the user includes receiving from a certification server an encryption key allocated to the processor emulation program, and installing the key.

8. The method according to claim 1, wherein the transaction device is a second portable device linked to the transaction server, and wherein the transaction is performed between a first processor emulation program executed by the transaction server and a second processor emulation program executed by the transaction server.

9. A near field transaction system for performing a transaction, the system comprising:
　a transaction device including near field communication circuitry;
　a portable device including near field communication circuitry and wireless communication circuitry;
　a transaction server located externally and remotely from the portable device and the transaction device, the transaction server including a memory area having a processor emulation program installed therein, the processor emulation program, when executed by the transaction server, being configured to:
　　process transaction device Application Protocol Data Units (APDUs) sent by the transaction device; and
　　send transaction server APDUs to the transaction device;
　the portable device, the transaction device and the transaction server being collectively configured to:
　　establish, via the Internet network using the wireless communication circuitry of the portable device, a data link between the transaction server and the near field communication circuitry of the portable device;
　　based on information provided to the transaction server by the portable device or the transaction device, activate the processor emulation program of the transaction server and operatively couple the processor emulation program to the near field communication circuitry of the portable device through the data link;
　　establish a contactless near field communication channel between the portable device and the transaction device using the near field communication circuitry of the portable device and the near field communication circuitry of the transaction device;
　　receive, by the portable device via the contactless near field communication channel, the transaction device APDUs;
　　transfer, by the portable device to the transaction server via the data link, the transaction device APDUs;
　　receive, by the portable device via the data link, the transaction server APDUs;

transfer, by the portable device to the transaction device via the contactless near field communication channel, the transaction device APDUs;

as a result of the transaction server executing the processor emulation program:

receive, by the transaction server using the portable device acting as an intermediary, the transaction device APDUs;

process, by the transaction server, the transaction device APDUs; and send, to the transaction device using the portable device as the intermediary, the transaction server APDUs; and process, by the transaction device, the transaction server APDUs, the transaction device APDUs including responses to commands sent to the transaction device by the transaction server, or commands sent by the transaction device to the transaction server, and the transaction server APDUs including commands sent by the transaction server to the transaction device, or responses to commands sent to the transaction server by the transaction device, wherein the near field communication circuitry of the portable device, during performance of the transaction, acts as the intermediary between the transaction serve rand the transaction device.

10. The system according to claim 9, wherein the processor emulation program is further configured to emulate a chip card and perform a transaction with a payment point.

11. The system according to claim 9, wherein the processor emulation program is further configured to emulate a payment point so as to perform a transaction with a chip card or a second portable device emulating a chip card.

12. The system according to claim 9, wherein the transaction server includes a memory area allocated to a user and includes a plurality of processor emulation programs, each processor emulation program of the plurality of processor emulation programs being configured to emulate a respective secure processor located within the portable device.

13. The system according to claim 12, further comprising a service management program in the transaction server that is configured to, as a function of the information provided the portable device, automatically select a processor emulation program from the plurality of processor emulate programs.

14. The system according to claim 9, wherein the portable device is a device exclusively dedicated to perform transactions.

15. The system according to claim 9, wherein the portable device is a mobile phone or a personal assistant.

16. The method according to claim 1, wherein the activating the processor emulation program includes activating the processor emulation program after the contactless near field communication channel is established.

17. The system according to claim 9, wherein the processor emulation program is activated after the contactless near field communication channel is established.

* * * * *

UNITED STATES PATENT AND TRADEMARK OFFICE
CERTIFICATE OF CORRECTION

PATENT NO. : 10,185,950 B2
APPLICATION NO. : 13/297378
DATED : January 22, 2019
INVENTOR(S) : Charrat Page 1 of 1

It is certified that error appears in the above-identified patent and that said Letters Patent is hereby corrected as shown below:

In the Claims

In Column 15, Claim 2, Line 48, delete "1, comprising" and insert -- 1, further comprising --, therefor.

In Column 15, Claim 4, Lines 62-63, delete "respective of the plurality...as a respective" and insert -- respective --, therefor.

In Column 17, Claim 9, Line 27, delete "serve rand" and insert -- server and --, therefor.

In Column 18, Claim 13, Line 16, delete "emulate" and insert -- emulation --, therefor.

Signed and Sealed this
Thirtieth Day of July, 2019

Andrei Iancu
*Director of the United States Patent and Trademark Office*